July 18, 1944.  H. O. DAY  2,353,655
MOBILE LOADING EQUIPMENT
Filed May 26, 1943   11 Sheets-Sheet 1

INVENTOR.
HERBERT O. DAY,
BY Arthur Middleton
ATTORNEY

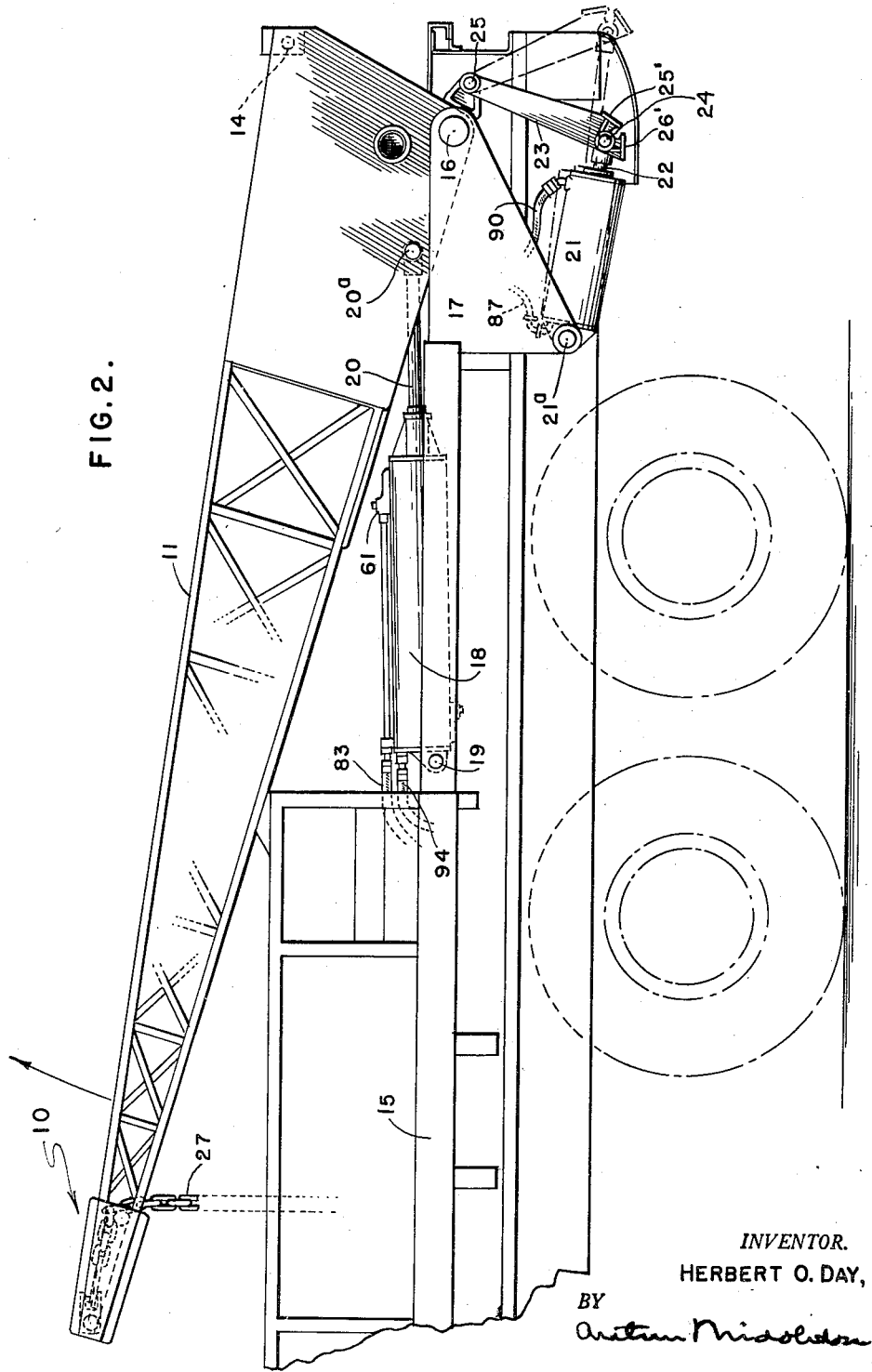

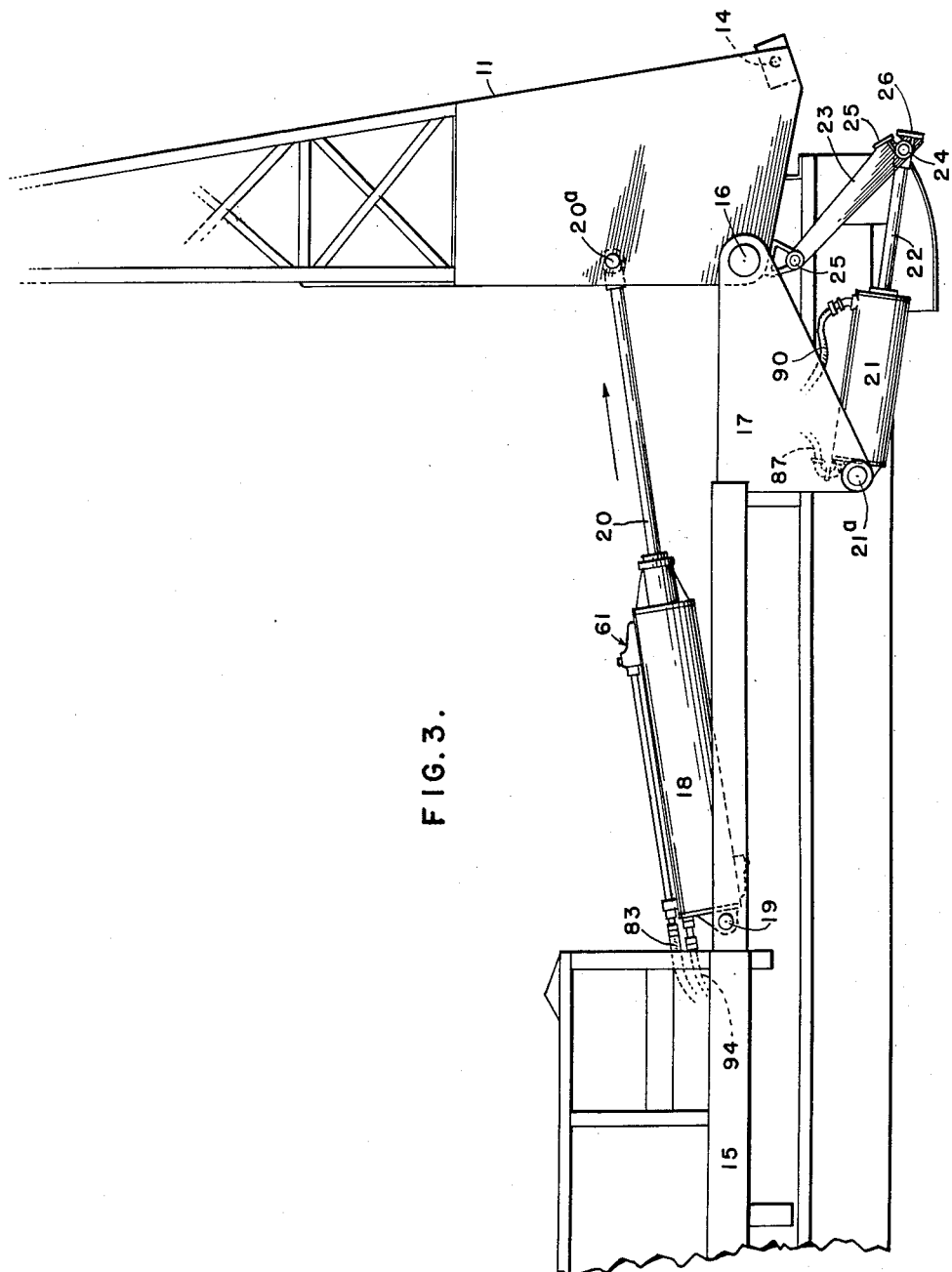

July 18, 1944.   H. O. DAY   2,353,655
MOBILE LOADING EQUIPMENT
Filed May 26, 1943   11 Sheets-Sheet 7

INVENTOR.
HERBERT O. DAY,
BY
ATTORNEY

FIG.II.

INVENTOR.
HERBERT O. DAY,
BY
ATTORNEY

Patented July 18, 1944

2,353,655

UNITED STATES PATENT OFFICE 2,353,655

MOBILE LOADING EQUIPMENT

Herbert O. Day, Bowling Green, Ohio

Application May 26, 1943, Serial No. 488,531

8 Claims. (Cl. 214—77)

This invention relates to hoisting equipment or apparatus, and more specifically to mobile loading equipment for trucks and unitary therewith, and provided with power actuated apparatus for lifting loads onto and off the vehicle or truck.

Some of the objects of this invention are to provide apparatus unitary with the truck, whereby the truck can be loaded and unloaded rapidly and efficiently; apparatus which is powerful in operation and mechanically efficient; apparatus whereby the load is at once lifted and moved in a linear direction either rearwardly, that is in a direction away from the ground and over the rear end onto the truck or forwardly, that is from the ground onto the truck; apparatus whereby sustained power is effectively applied to a hoisting frame or loading boom over a relatively long path of its angular travel and in spite of unfavorable leverage conditions at the end thereof; apparatus which is constructed compactly and in such a manner with respect to the truck that the loading space thereon remains substantially unobstructed, or else whereby a maximum of loading space can be utilized; apparatus that lends itself for attachment to standard type trucks; apparatus with improved hydraulic and control means which are simple, foolproof, and safe, and yet capable of a variety of novel functions, and apparatus so constructed that the load carried by the hoisting frame or loading boom is effectively counterbalanced.

The basis for attaining these objects lies, according to this invention, in providing a hoisting frame or boom hinged to and substantially straddling the rear end of the truck and swingable about a horizontal axis at the rear end of the truck so that the load attached to or suspended from the boom passes through the space between the straddling portions or legs or posts of the boom when the same is being swung to and fro when loading and unloading. Improved hydraulic power equipment is provided for effectively controlling the operation of the boom over a relatively wide arc or swinging movement whereby unfavorable leverage conditions between the power cylinders and the loading boom are substantially compensated for. Otherwise expressed, these objects are attained by means of a hydraulic power system which pushes as well as pulls the loading boom during a critical load lifting phase thereof, and wh'ch in turn is also operable to effectively cushion the load while lowering.

Features of the invention relate to the arrangement and function of the hydraulic power cylinders for actuating the boom, and to the hydraulic control system thereof.

According to one feature, a main hydraulic power cylinder acts upon the hoisting frame or loading boom at one side of the hinging point thereof, while an auxiliary cylinder cooperatively associated with the main cylinder acts upon the boom at the opposite side of the hinging point thereof. The power actions of these cylinders are co-active and are coordinated for effectively sustaining a load over a relatively wide arc of swinging movement of the boom about the horizontal axis as the load is swung either onto or off the truck, that is in spite of unfavorable leverage conditions. Operation under these conditions is made possible by a construction which allows the auxiliary power cylinder to detach itself from the hoisting frame during a part of the pivotal movement thereof, whereas the main power cylinder remains operatively connected with the frame. That is to say, the operating connection of the auxiliary cylinder with the boom is interrupted at the end of a power stroke of that cylinder, while the main cylinder continues actively to operate. Conversely, the auxiliary cylinder will also act as a load cushioning or load intercepting means when a load is moved in the opposite direction.

Another feature lies in the hydraulic control system for the cylinders comprising a master control valve of the sliding piston type, and having but a single control handle for performing all phases of the normal working cycle of the hoisting frame, including controlled forward and rearward swinging movements under load, as well as the optional locking of the frame in any intermediate load position.

Another feature lies in the manner in which the main cylinder and the auxiliary cylinder are cooperatively interconnected in the hydraulic system, and hydraulically interbalanced.

According to still another feature, auxiliary valve means are provided whereby the hydraulic operating conditions normally established in the control system incident to the normal working cycle thereof, can be modified at will in a manner to enable the empty loading boom to be moved by only one cylinder, while the associated cylinder is caused to remain inactive, that is with its piston rod retracted into the cylinder.

Another feature provides that the auxiliary valve means be so constructed as to provide for an alternative manner of operation, whereby a particularly close control of the load lowering movement is made possible, that is a sufficiently slow and uniform lowering of the load to the ground.

Still other features lie in various operating safeguards embodied in the hydraulic control system.

In a preferred embodiment, a main hydraulic power cylinder is provided at each side of the truck to engage the boom above the hinging point, while the auxiliary cylinder is associated with each main cylinder to engage the boom below its hinging point. The equipment as a whole is designed so as to lend itself for attachment to standard type trucks, so that the same may thus be converted.

The invention possesses other objects and features of advantage, some of which with the foregoing will be set forth in the following description. In the following description and in the claims, parts will be identified by specific names for convenience, but they are intended to be as generic in their application to similar parts as the art will permit. In the accompanying drawings there has been illustrated the best embodiment of the invention known to me, but such embodiment is to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings in which Figure 1 is a perspective view upon the truck from a rear corner, showing the loading boom in inactive position overlying the truck.

Fig. 2 is a partial side view of the truck with the boom position as shown in Fig. 1.

Fig. 3 shows the loading boom raised from the truck to an intermediate position by the master cylinder, while the piston rod of the associated auxiliary cylinder is still detached but ready to receive the load pressure from the boom.

Figure 1:
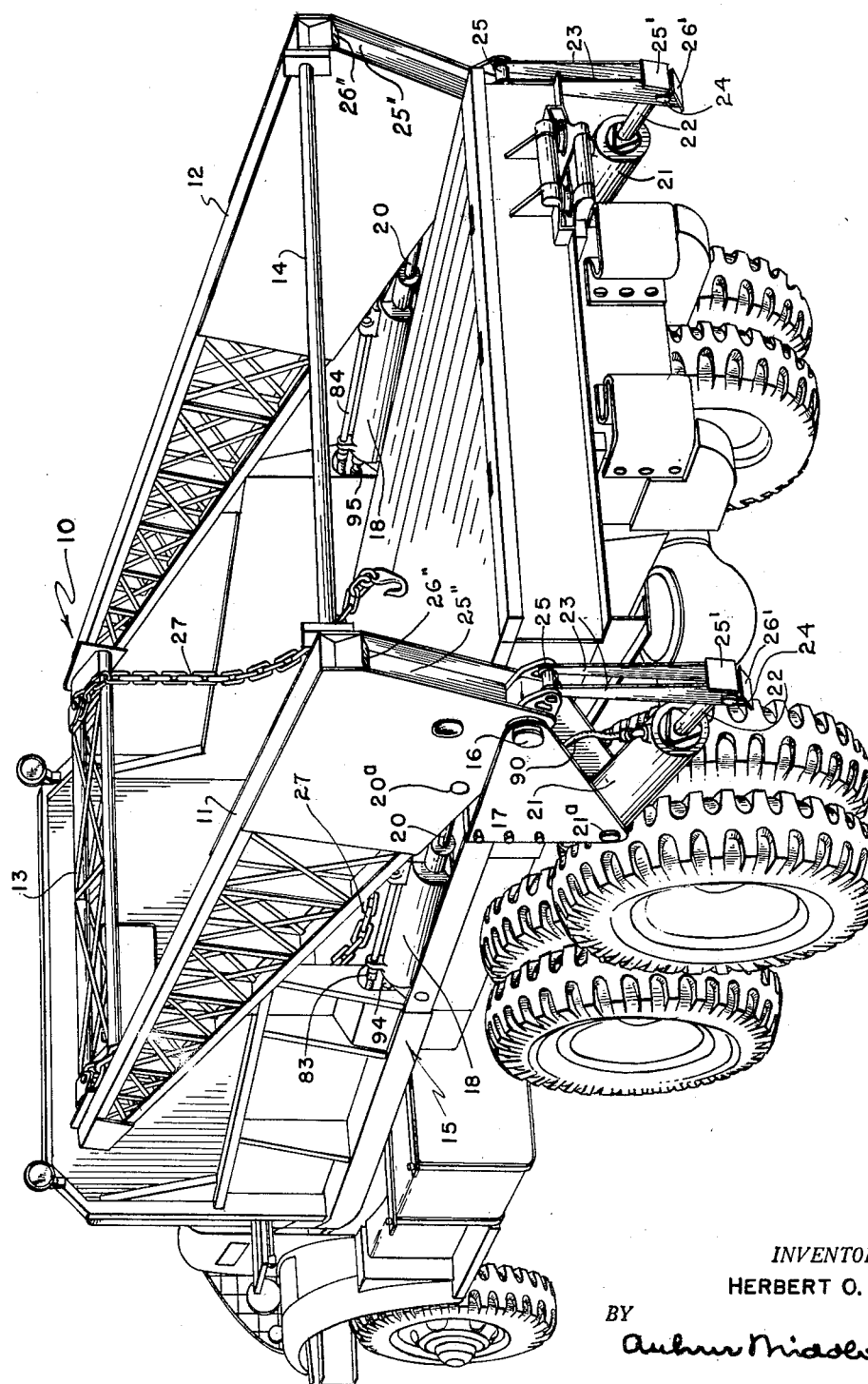

An embodiment of the invention is exemplified in the perspective showing in Fig. 1 of a truck of substantially standard design, and provided with the hoisting equipment for loading and unloading it, which equipment comprises a hoisting member or loading boom in the form of a frame 10 consisting of a pair of lateral portions or legs or posts 11 and 12 interconnected at the top end by a cross beam 13, and at the foot end by a transverse rod 14. The hoisting frame or beam 10 is pivotally mounted for swinging about a horizontal axis by being hinged to the chassis 15 of a truck as shown, the hinging means or pivots 16 being provided upon a bracket construction 17.

A main hydraulic power cylinder 18 is provided at each side upon the chassis, the rear end of the cylinder being pivotally mounted as at 19 on the chassis, while the end of the piston rod 20 of that cylinder is pivotally connected as at 20ᵃ with the hoisting frame 10 at a point above the hinging axis thereof.

An auxiliary hydraulic power cylinder 21 has its rear end pivotally mounted upon the bracket construction 16 as at 21ᵃ, while the piston rod 22 thereof has a one-way or detachable operative connection with the frame 10 through a link member the one end of which has a pivotal connection 24 with the piston rod 22 and the other end a pivotal connection 25 with the frame 10. Near the pivotal connection 24 this link member 23 is provided with a pair of abutment faces 25' and 26' having angular relation with respect to each other and constituting in effect a saddle whereby to engage or to be engaged by corresponding contact faces 25'' and 26'' which are provided at the extreme bottom end of the hoisting frame 10.

A chain device whereby a load may be attached to the hoisting frame in properly balanced manner is indicated as at 27. That is to say, the means for suspending are so designed that the load will be hung centrally in the frame.

The loading boom 10 is power actuated from the engine of the truck, in that the engine through a controllable clutch drives a hydraulic power pump which in turn forces pressure transmitting fluid to the power cylinders.

Figure 5:
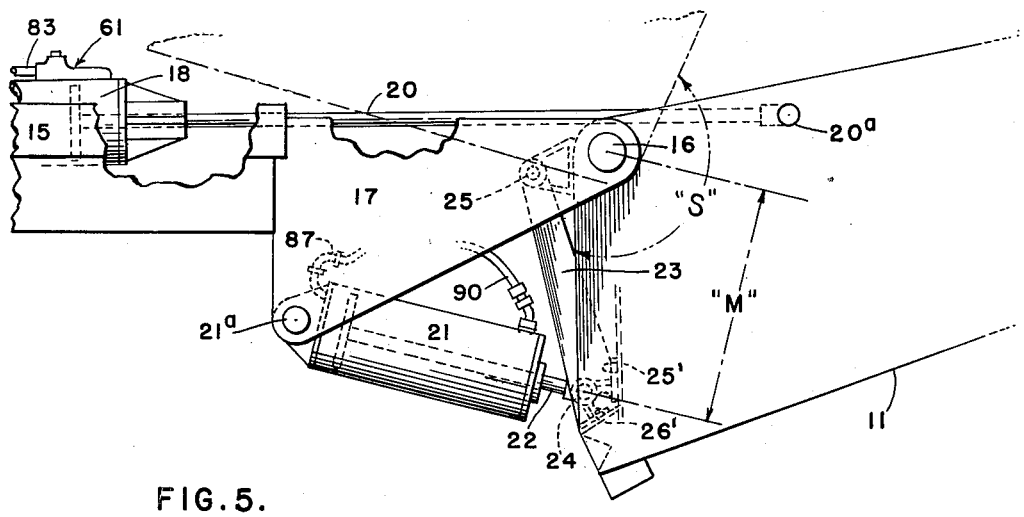
Fig. 5 shows the boom in its extreme extended or outwardly cantilevering position, and the corresponding conditions of the boom cylinders.
Figure 4:
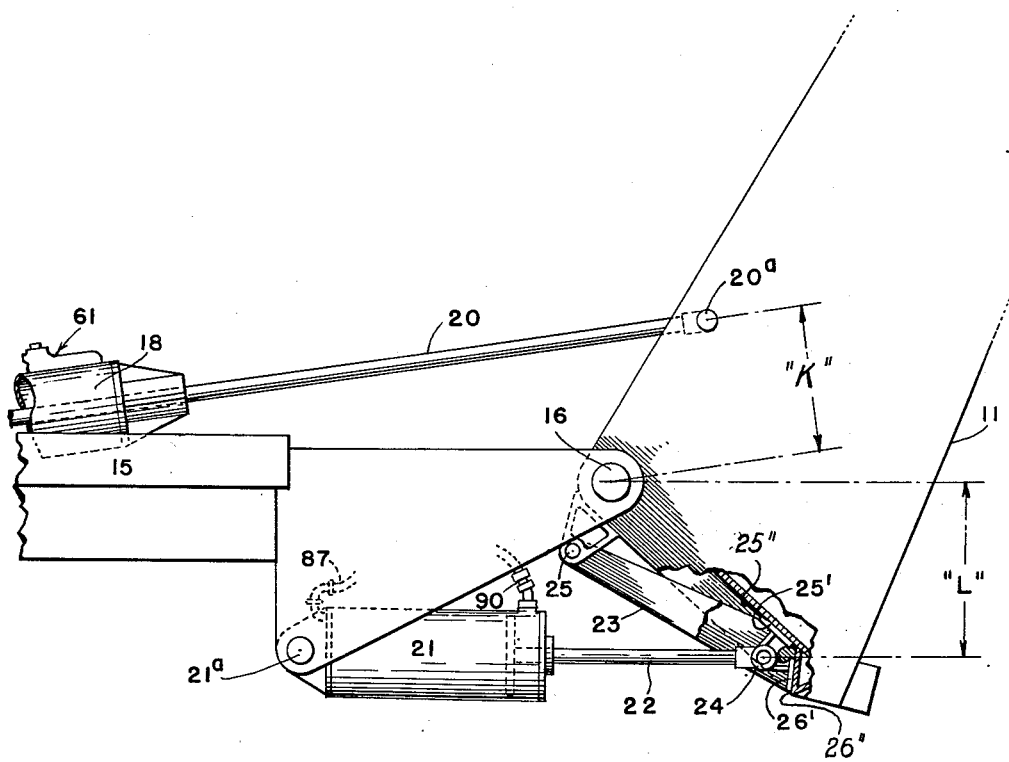
Fig. 4 shows the boom past the dead center position, and having engaged the previously extended piston rod of the auxiliary power cylinder, whereby load pressure from the boom is transferred to the auxiliary cylinder and absorbed thereby in cushioning the load.

The inactive condition of the loading boom 10 and of the hydraulic actuating cylinders 18 and 21 at each side of the truck are shown in Fig. 2, while various operating conditions of the boom and of the power cylinders are shown in Figs. 3, 4 and 5. The function of the operating cycle of loading and unloading will be more clearly understood in view of the diagrammatic illustrations in Figs. 6 to 11 showing the various operating conditions of the hydraulic system that controls the operation of the power cylinders.

There will now be presented first a numerical description of the elements of the hydraulic control system as shown in Figures 6 to 11, then a description of the control system when in neutral condition, that is, when the loading boom is held fixed in an intermediate position, and this will be followed by a description of the functioning of the entire normal operating cycle, as well as of certain other optional effects that can be produced with and by the manipulation of this control system.

The hydraulic control system comprises a reservoir 28 for the pressure fluid, a power gear pump 29, a master control valve 30, an auxiliary control valve 31, the main or master hydraulic power cylinders 18, one at each side of the truck, and the auxiliary hydraulic power cylinders 21, one at each side.

Figure 6:
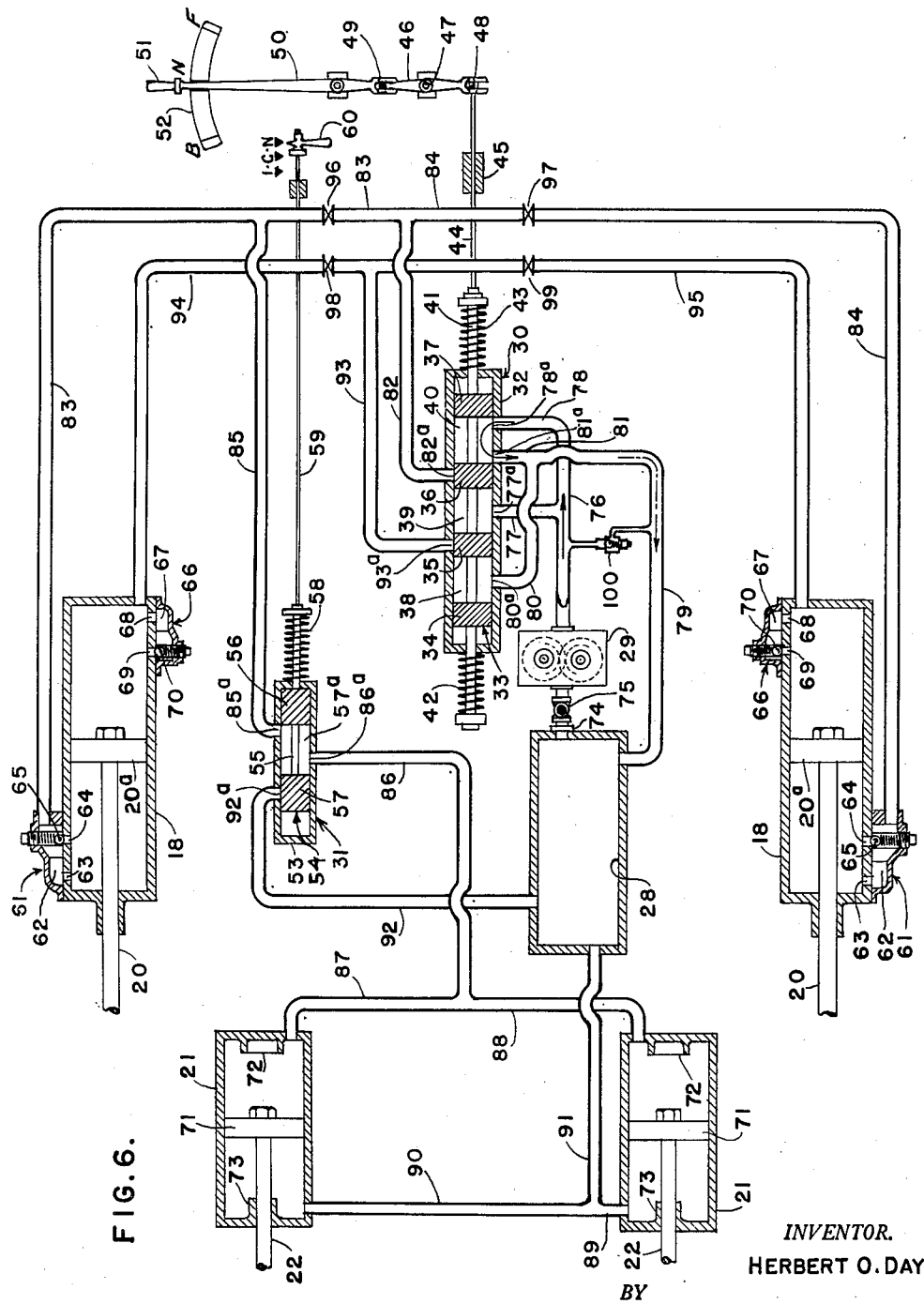
Figs. 6 to 12 are diagrammatic views of the hydraulic control system, showing various operating conditions thereof.
Figure 7:
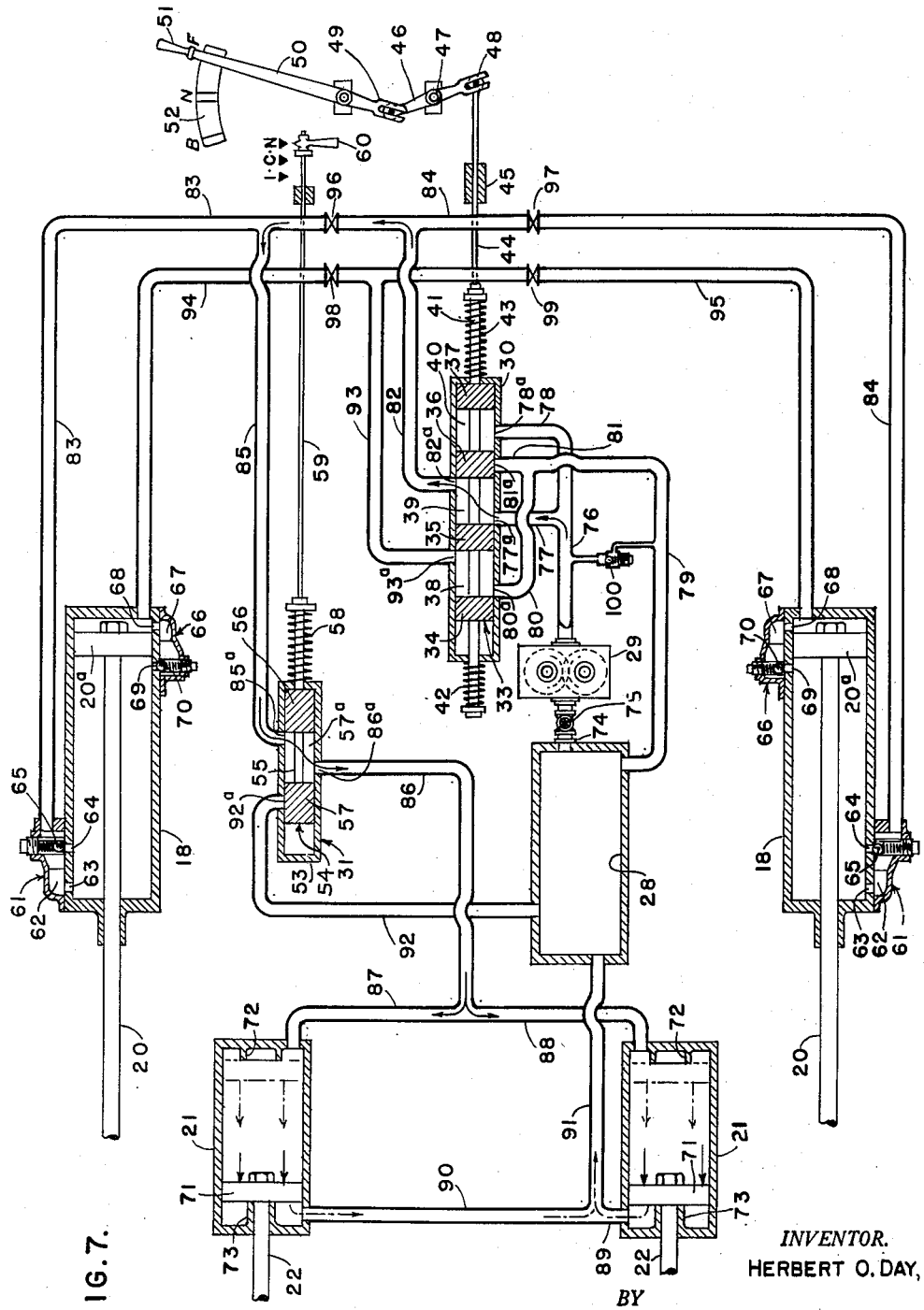
Figure 8:
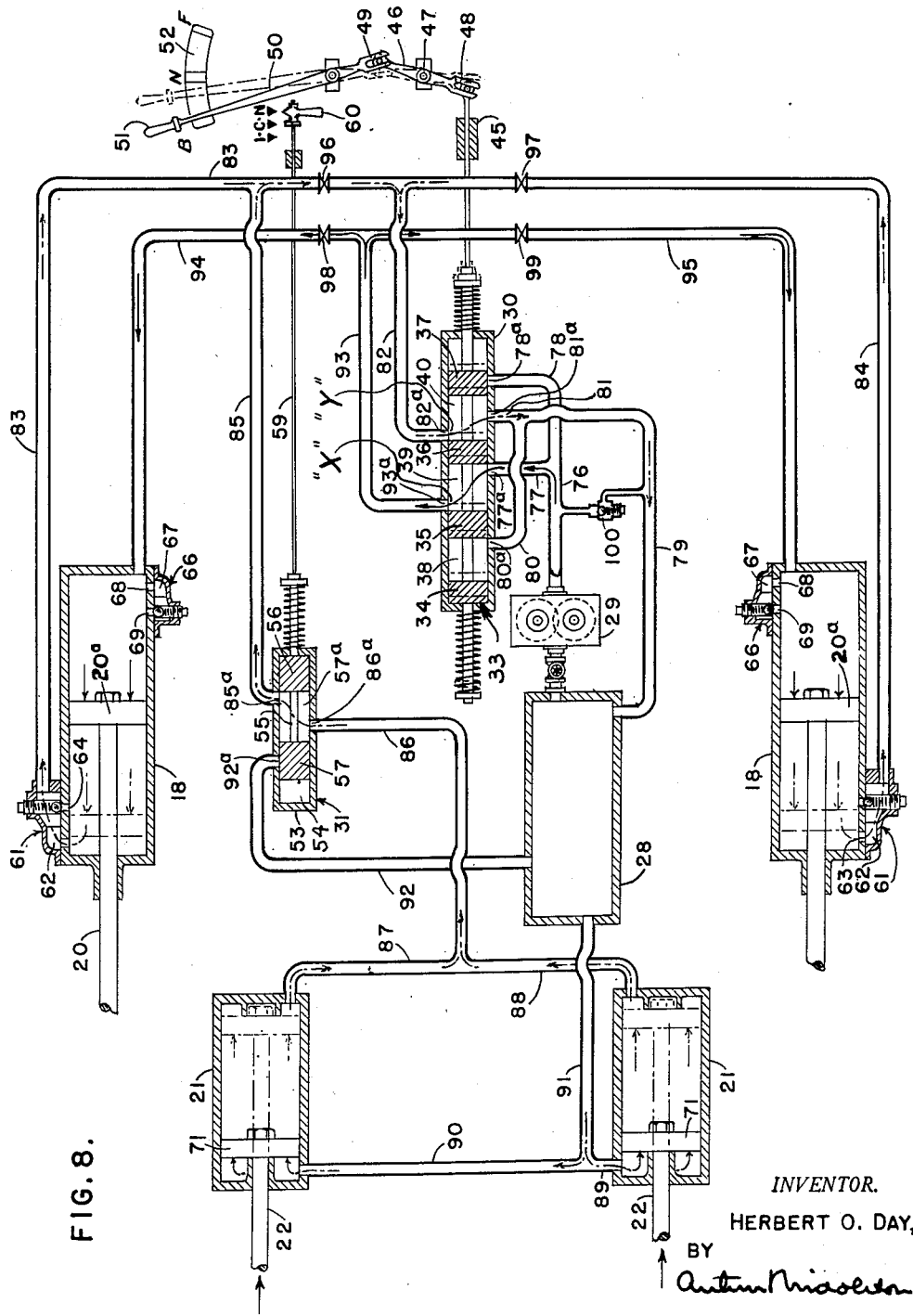

The master control valve 30 is of the sliding piston or pressure balanced type, and comprises a cylindrical housing 32 in which is axially slidable a valve member 33 provided with cylindrical portions or lands 34, 35, 36 and 37, having sealing engagements with the valve housing 32 it which they are slidably operable. The land portions are separated from one another by grooves constituting valve chambers or potential flow passages 38, 39 and 40. The valve member 33 thus also comprises a valve stem 41 which is normally held in neutral position by springs 42 and 43 which are compressed in a manner to balance each other, each spring being provided with suitable tension adjusting means to insure that the valve member will assume its neutral position when otherwise released. The valve stem 41 has an extension rod 44 guided as at 45 and axially shiftable together with the valve stem by suitable actuating means such as indicated by a double-armed lever 46 having a stationary pivot 47, a sliding pin connection 48 with the extension rod 44, and another sliding pin connection 49 with a main control lever 50, the upper end of which is provided with a handle 51 movable in an arcuate guide 52 in which it may occupy the neutral position N (as shown in Fig. 6), or an extreme forward position F (as shown in Fig. 7), or an extreme backward position B (as shown in Fig. 8).

Figure 9:
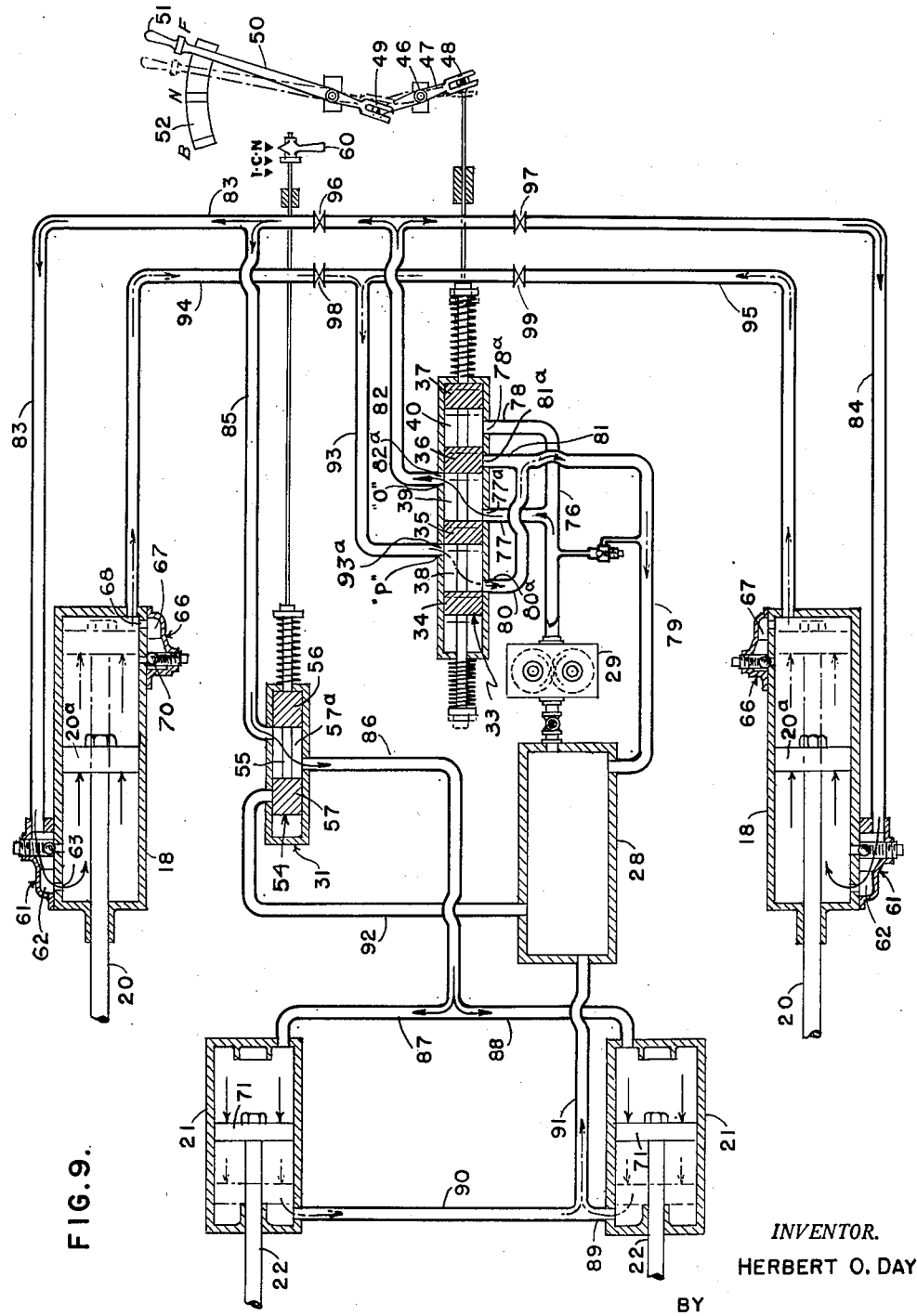
Figure 10:
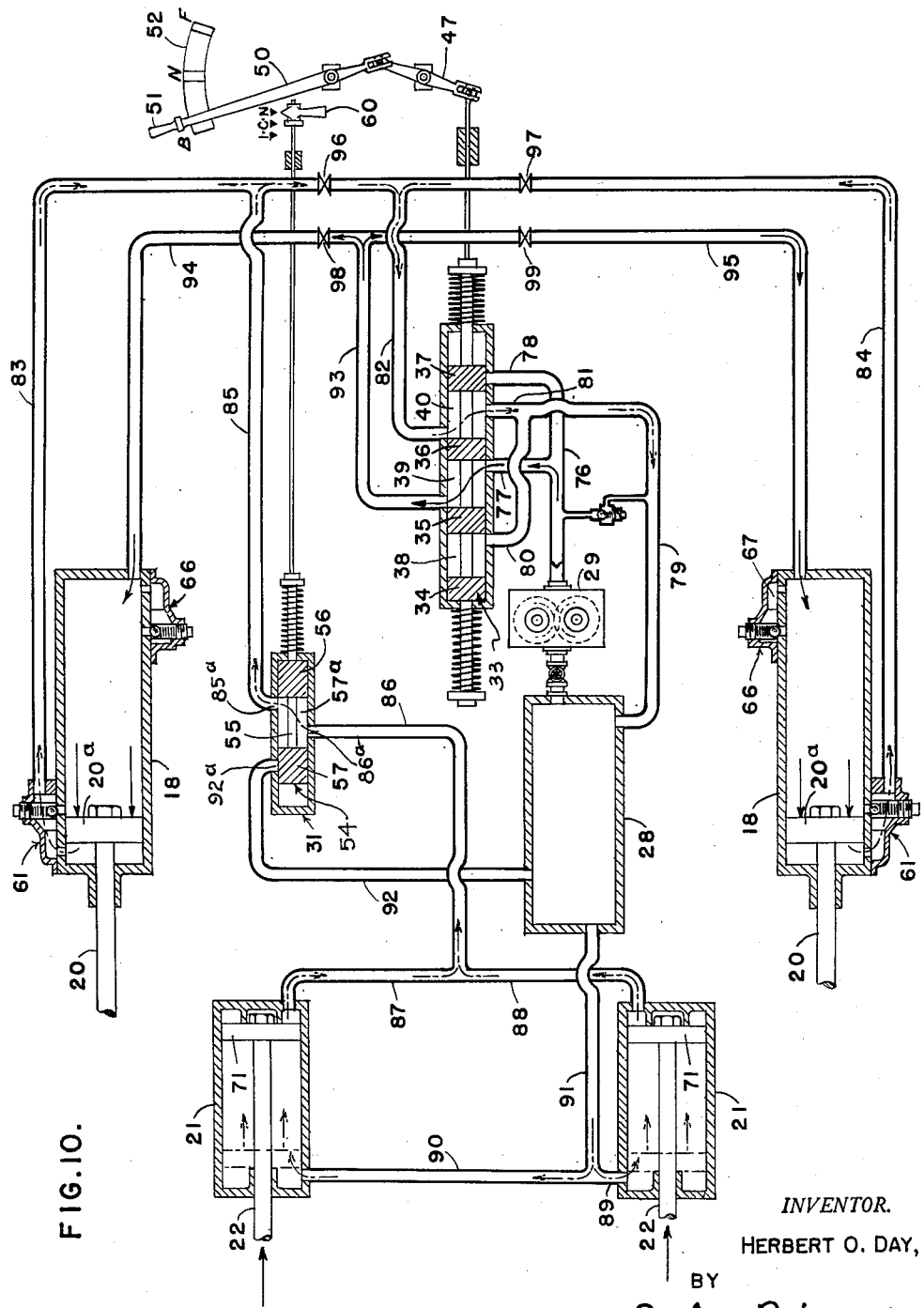
Figure 11:
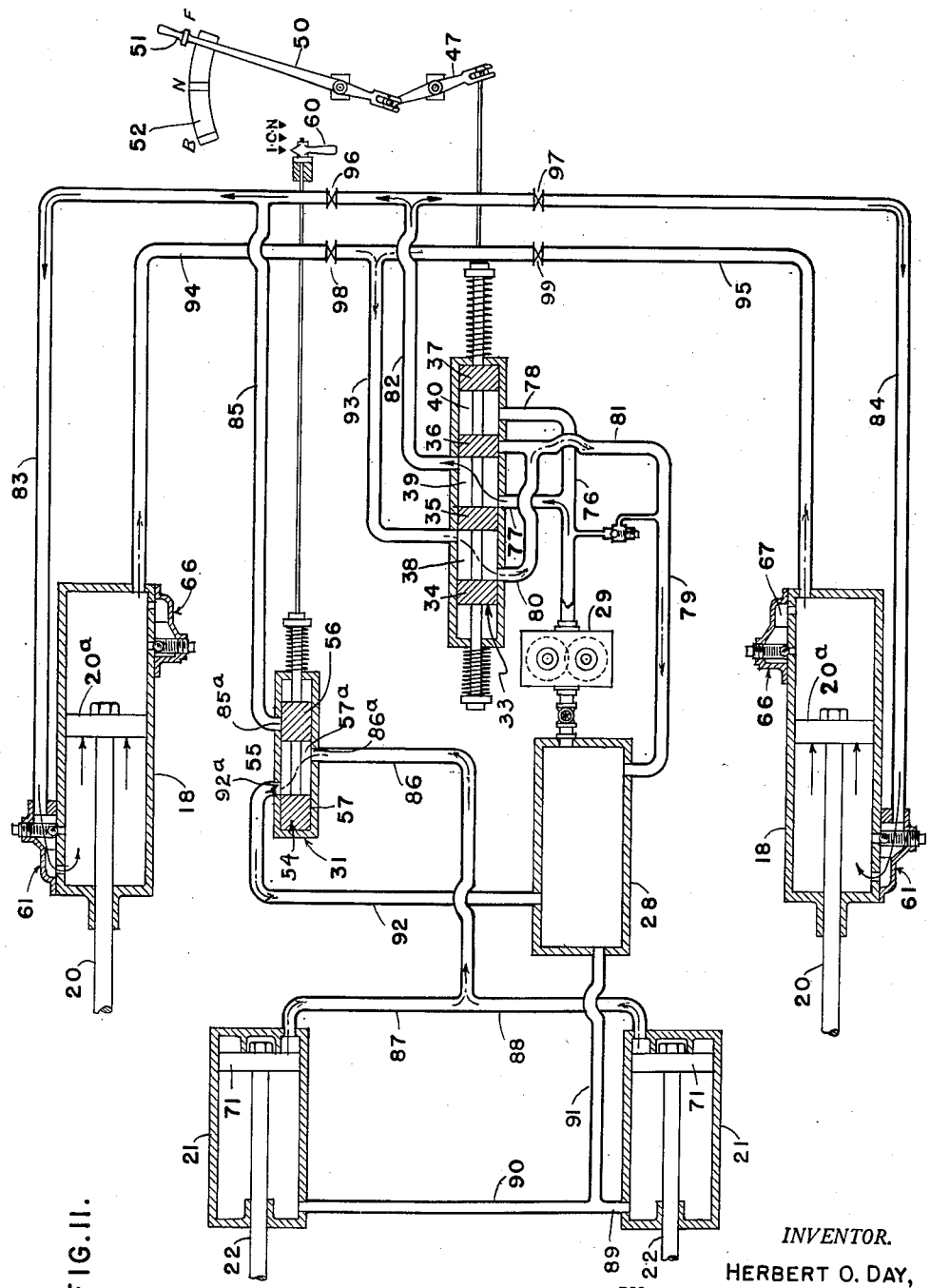

The auxiliary control valve 31 comprises a cylindrical housing 53, a valve member 54 slidable therein and having a stem 55, and formed with cylindrical or land portions 56 and 57 and forming between them a groove or flow passage chamber 57ª surrounding the stem, which stem is normally held in the position shown in Figures 6 to 10 by means of a spring 58, but which is axially shiftable against spring pressure by way of an extension rod 59 having a handle 60 to a position shown in Fig. 11.

Each of the two main hydraulic power cylinders 18 is shown in the diagrams (Figs. 6 to 11) to have a piston 20ª connected with the piston rod 20. The cylinder has a check- and relief valve 61 at the front end, which valve comprises a chamber 62 having a port 63 leading into the cylinder close to the front end thereof, and another port 64 leading into the cylinder a short distance further away from the end of the cylinder and from the other port 63, the port 64 being closed by a spring loaded ball 65. A similar check- and relief valve 66 is provided at the opposite end of each cylinder 18, and comprises a chamber 67, a port 68 close to the bottom end of the cylinder, and another port 69 somewhat further away from the cylinder end and spaced from the port 66, the port 69 being closed by a spring loaded ball 70.

Each of the two auxiliary hydraulic power cylinders 21 has a piston 71 fastened to the piston rod 22, a stop collar 72 at the cylinder bottom, another stop collar 73 at the top end of the cylinder.

The conduit connections for the fluid of the hydraulic control system are as follows:

From the reservoir 28 a suction connection 74 leads to the gear pump 29 by way of a shut-off valve 75. From the pump 29 a pressure conduit 76 leads to the master control valve 30 by way of two branches 77 and 78 which connect with the interior of the valve housing 32 by way of corresponding ports 77ª and 78ª. A drainage or low pressure connection between the master valve 30 and the reservoir 28 comprises a common conduit 79 having two branch conduits 80 and 81 leading from the valve housing 32 by way of corresponding ports 80ª and 81ª.

One actuating connection between the master valve 30 and the hydraulic power cylinders 18 and 21 comprises a common conduit 82 leading from the valve housing by way of a port 82ª, and having one branch conduit 83 leading to the front end of the one of the main cylinders 18 and another branch conduit 84 to the front end of the other main cylinder 18. The branch conduit 83 in turn has a sub-branch connection 85 leading to the auxiliary control valve 31 and into the housing thereof by way of a port 85ª. This connection 85 may be continued through a conduit 86 leading from the valve housing of auxiliary valve 31 by way of a port 86ª, the conduit 86 in turn having a branch conduit 87 leading to the rear end of one of the two auxiliary power cylinders 21 and another branch conduit 88 leading to the rear end of the other auxiliary cylinder 21.

The front ends of the auxiliary cylinders 21 have an outlet or drain or low pressure connection 89 and 90 respectively, which merge into a common conduit 91 leading to and into the reservoir 28. A special conduit 92 leads from the housing 53 of the auxiliary control valve 31 by way of a port 92ª to the reservoir 28.

The rear ends of the main power cylinders 18 are connected with the master control valve 30 by means of a common conduit portion 93 having a branch conduit 94 leading to the rear end of the one main power cylinder 18 and another branch conduit 95 leading to the rear end of the other main power cylinder 18.

Shut-off valves 96, 97, 98 and 99 are shown to be provided in the respective branch connections 83, 84, 94, and 95.

A spring loaded general relief valve 100 connects the high pressure conduit 76 leading from the gear pump 29 with the low pressure or drain connection 79 to the reservoir 28.

*Operation*

When the hydraulic control system has its master control lever 50 placed in the intermediate or neutral or N position, the system is in neutral condition as shown in Fig. 6. In that condition and referring to Fig. 6, it is assumed that the boom 10 has been swung out past its vertical or dead center position to a position resembling that shown in Fig. 4. In other words, this position is selected as an example of a position of the boom in which the same may be locked, while the gear pump 29 is nevertheless kept running. It is understood, of course, that otherwise the pump may be disconnected from the truck engine by suitable clutch means.

Also at the same time, the ports 82ª and 93ª of the master valve housing are closed by the cylindrical or land portions 36 and 35 respectively, thereby blocking the volumes of fluid, that are trapped at each side of the pistons 20ª of both of the power cylinders 18. The closing of the port 82ª moreover, has a dual effect in that it also traps that fluid volume in the two auxiliary power cylinders 21, that acts upon or is bounded by the full area of the piston 71. Consequently, at this time, with the boom in its Fig. 4 position, the load acts as a compressor force upon the piston rods 22 of the auxiliary power cylinders 21 now hydraulically locked.

In order to describe the operating cycle proper, let it be assumed that the apparatus is in the inactive condition shown in Fig. 2, where the piston rods of all power cylinders, that is of the main as well as the auxiliary cylinders, are in a retracted position while the boom is in its inactive angular position overlying the truck. A preliminary phase now to be executed by the control system prior to the actuating of the load hoisting cycle proper, is shown in Fig. 7 and also pictorially in Fig. 1, that is the phase in which the piston rods 22 of the auxiliary power cylinders 21 are extended preliminary to the swinging out of the boom 10. By this preliminary operation the auxiliary cylinders 21 must be conditioned and enabled to intercept or cushion the load from the boom when the same passes through the latter phase of its outward swinging movement.

According to Fig. 7, this effect (mainly the preliminary extending of the piston rods 22) is attained by placing the main control lever 50 in the extreme forward or F position, whereby the master valve member 33 is accordingly moved forward, establishing a throughflow connection between the ports 77ª and 82ª by way of the flow passage chamber or groove 39, and another throughflow connection between the ports 93ª and 80ª by way of the flow passage chamber or groove 38.

Thus, fluid under pressure from the pump 29 acts through conduit 76, branch 77, port 77ª, flow passage chamber 39, port 82ª, conduit 82, branch conduit 83, into the chamber 62 of the check- and relief valve 61, and hence through port 63 into the interior of the main power cylinder 18, where it acts upon the annular face of the piston 20ª, holding the same down upon the cylinder bottom as in the position shown in Fig. 7. In the same manner, the piston 20ª of the other cylinder 18 is retained in its bottom position by the hydraulic pressure acting simultaneously through the branch conduit 84.

At the same time, the hydraulic pressure thus established in that part of the system which includes the common conduit 82 of the branch conduits 83 and 84, also propagates itself through the sub-branch conduit 85 to the auxiliary control valve 31, there through port 85ª, flow passage chamber 57ª, port 86ª, conduit 86 and through branch conduits 87 and 88 into the rear end of the two auxiliary cylinders 21. This allows the pressure to act upon the full face of the pistons 71, moving them and their piston rods 72 from the position shown in dot-and-dash lines outwardly to the opposite end of the cylinder, where the pistons 71 are stopped by abutment against the stop collars 73, having reached the position shown in full lines, namely short of the ports 89ª and 90ª leading into the respective branch conduits 89 and 90 which are thus kept in free communication with the interior of the cylinders 21. The preliminary extension of the auxiliary piston rods thus established is indicated in Fig. 2 by the position of the parts shown in dot-and-dash lines.

It will thus be seen that the Fig. 7 phase of the operation corresponding to the F position of the master control handle 51, will have caused the extension of the piston rods 22 of the auxiliary power cylinders 21 while maintaining retracted the piston rods 20 of the main power cylinders 18. It will be seen that any excess pressure which may develop during this phase in the main power cylinders 18, can relieve itself by overcoming the pressure upon the spring pressed ball 70, permitting excess fluid to pass through the valve chamber 67 and through the port 68 to reach the conduit 94 then acting as a drain connection leading back to the reservoir by way of conduit 93, the then open flow passage chamber 38, the branch conduit 80 and the conduit 79 leading into the reservoir.

It will also be seen that the fluid being displaced from the auxiliary cylinders 21 will pass through the branch conduits 89 and 90 respectively and through the common conduit 91 back into the reservoir 28. It will further be seen that during this operating phase the branch conduit 78 of the pressure conduit 76 as well as the branch conduit 81 of the drain conduit 79, are blocked by the position of the master valve member 33. Furthermore, the position of the valve member 54 of the auxiliary control valve 31 indicates that at this time the conduit 82 is blocked by the valve member and therefore inactive.

Next follows that operating phase (see Fig. 8) whereby a load is moved from the truck down to the ground by swinging the boom 10 through an arc S to its outward position (see Figs. 4 and 5). This phase is initiated by shifting the master control lever 50 from its "F" position (shown in Fig. 7) to the B position (shown in Fig. 8). Then the corresponding position of the master valve member 33 is such as to establish a pressure flow connection between the port 77ª and the port 93ª by way of the flow passage chamber 39, and a relief flow or drain flow connection between the port 82ª and port 81ª by way of flow passage chamber 40. Meanwhile, branch 78 of pressure conduit 76 and branch 80 of return or drain conduit 79 are blocked by the position of the master valve member 33.

Thus the pressure from the pump 29 acts through conduit 76, branch 77, port 77ª, flow passage chamber 39, port 93ª, conduit 93, thence simultaneously through the branch conduits 94 and 95 to the rear ends of the respective main power cylinders 18, the pressure thus finally acting upon the full face of the pistons 20ª and moving them outwardly, thereby swinging the boom 10 from its Fig. 2 inactive position through successive stages shown in Figs. 3 and 4 to its extreme outward position shown in Fig. 5. During this outward swinging movement of boom 10, as the same with load passes through the approximately vertical or unstable dead center position (see Fig. 3) the stress upon the main piston rods 20 changes from compression to tension as the load suspended from the transverse member 13 of the boom passes through the frame-like structure thereof and across the axis of rotation defined by the hinging points 16 of the boom. This reversal of force, and thus an undesired sudden acceleration of the boom and its load, can be controlled or counteracted at this time by allowing the control handle 51 to return from its B position part way towards the neutral or N position (this partially returned position of the control lever 50 being indicated in dot-and-dash lines).

This establishes a corresponding position (also shown in dot-and-dash lines) of the master valve member 33, whereby the ports 93ª and 82ª are closed except for a crack X and Y respectively. By regulating the "cracked" condition of the master control valve by the manipulation of the handle 51, the passage of hydraulic liquid through the respective cracks can be controlled or throttled in a manner to enable the operator to ease the boom and the load down to the Fig. 4 position in which the boom is intercepted by the saddle faces 25' and 26' engaging the corresponding contact faces 25" and 26" on the bottom portion of the boom. It will be noted that these points of engagement are so disposed that at this time there will be established a leverage L by the piston rods 22 with respect to the hinging axis of the boom.

The weight of the boom 10 now tends to push the pistons 71 back towards the bottom of the cylinders 21, while the back pressure underneath the pistons acting upon the full face thereof is being regulated by the throttling effect of the crack Y established in the master control valve by the manipulation of the control handle 51. Therefore, as the flow is allowed to escape slowly from the auxiliary cylinders 21 by way of the crack Y of the master valve, the pistons 71 are allowed to move slowly towards the bottom of their cylinders, thus cushioning the load imposed upon them from the boom until the boom has reached its extreme outward angular position as shown in Fig. 5. At this time the control handle may be released completely, thus allowing the springs 42 and 43 of the master valve to restore the master valve member 33 to neutral position, and thereby also to restore the master control handle 51 to its neutral or N position which was shown in Fig. 6.

It will be understood that during this phase of the operation, the liquid being displaced from the top end of the main power cylinders 18 will escape through the port 63, the conduits 83 and 84 respectively, through the common conduit 82, the port 82a, the flow passage chamber 40, the branch connection 81, and the conduit 79 back to the reservoir 28. The liquid being displaced from the auxiliary cylinders 21 will escape from the bottom end thereof by way of the branch connections 87 and 88 respectively, from the common conduit 86, through the auxiliary control valve 31 by way of the port 86a, the flow passage chamber 57a, and the port 85a, thence through the sub-branch conduit 85, the branch conduit 83, the conduit 82, and then through the main control valve by way of the port 82a, the flow passage chamber 40, the port 81a, the branch conduit 81, and the return conduit 79 into the reservoir 28.

Next comes that phase of the operation, whereby a load may be picked up from the ground and placed onto the truck. The boom is therefore now assumed to be in the extreme outward position shown in Fig. 5. The return movement of the boom from that position is initiated by throwing the control handle to the extreme forward or F position, as shown in Fig. 9. This shifts the master valve member 33 forwardly, establishing in the master valve 30 a pressure flow connection form the port 77a through the flow passage chamber 39 to the port 82a, and a drain- or return flow connection from the port 93a through the flow passage chamber 38 to the port 80a.

Consequently, hydraulic pressure acts from the pump 29 through conduit 76, branch conduit 77, port 77a, flow passage chamber 39, port 82a, conduit 82, branch conduits 83 and 84, then through valve chamber 62 and ports 63 into the interior of the respective main power cylinders 18, the pressure thus acting upon the annular face of the pistons 20a, forcing the same back towards the bottom end of their cylinders, thereby transmitting traction force through the piston rods 20 to the boom 10. Simultaneously, the pressure established in branch conduits 83 and 84 also propagates itself through the sub-branch pipe 85, through the auxiliary valve 31, the conduit 86, and the branch conduits 87 and 88, to the rear end of the auxiliary power cylinders 21. The pressure thus acts upon the full face of the pistons 71, forcing the same outwardly, and thereby applying powerful initial lifting force to the boom 10 (note the leverage M in Fig. 5), in spite of the otherwise unfavorable angular position of the boom, until the boom is sufficiently raised for the piston rods 20 of the main power cylinders 18 to apply more effective leverage to the boom. Thus, during its return movement the boom will reach a position similar to that shown in Fig. 4, when the piston rods 20 of the auxiliary cylinders will have reached their extreme extended position, and the piston rods 20 of the main power cylinders will have attained a more favorable leverage K (see Fig. 4), while the auxiliary piston rods have attained the leverage L.

At this time, the continued retraction of the piston rods 20 will cause the boom to swing further back towards the truck, as force contact or force relationship between the boom and the piston rods 22 of the auxiliary power cylinders is interrupted. Due to the continued action of the hydraulic pressure in the main power cylinders 18 the return movement of the boom continues until the pistons 20a reach the bottom end of their cylinders. Should the pressure at this time be allowed to continue to act, it will simply relieve itself as the pressure fluid overcomes the resistance of the spring-pressed ball 70, and passes through the valve housing 67 and the port 68, through conduits 94 and 95 respectively, then through conduit 93, through the master valve 30 by way of port 93a, flow passage chamber 38 and port 80a, through branch conduit 80, and conduit 79, to the reservoir 28.

Again, since the force acting upon the piston rods 20 changes from tension to compression as the boom moves through its vertical or unstable dead center position, an undesired acceleration of the boom and of the load may be controlled and counteracted by the operator manipulating the handle, by returning the master control lever 50 part way towards the neutral or N position (as indicated in dot-and-dash lines). This will cause the master valve member 33 to assume the position also shown in dot-and-dash lines, whereby the opening of the ports 82a and 93a are reduced to cracks O and P respectively. The throttling effect through the "cracked" master valve can then be controlled accordingly by slightly manipulating the control handle 51 in such a manner that the load and the boom are gently eased down upon the truck, that is, to a position shown in Fig. 1.

It will be understood that during this return movement of the boom the fluid being displaced from the bottom end of the main power cylinders 18, escapes through conduits 94 and 95, the conduit 93, then across the master control valve 30 by way of port 93a, flow passage chamber 39, port 80a, branch conduit 80, and conduit 79, to reservoir 28. The fluid being displaced from the auxiliary cylinders 21 escapes through branch conduits 89 and 90, and the conduit 91 to the reservoir 78. It will also be understood that when the control lever 50 is released by the operator, it will automatically return to its neutral or N position, because of the interbalancing effect of the springs 42 and 43 acting upon the master valve member 33 and restoring the same to neutral position whenever allowed to do so, thereby blocking the position of the boom 10 wherever the same happens to be at the time the handle 51 is allowed to resume its neutral position.

If the operation of loading or unloading is now considered as being concluded, it remains that the piston rods 72 of the auxiliary cylinders 21 be retracted. This is accomplished by returning the boom 10 empty or idle to its extreme outward position by again throwing the control lever 50 to its B position (see Fig. 10). This will eventually leave the pistons 20a in their extreme outward position and the pistons 71 in their extreme inward position, all as shown in Fig. 10. The conditions then established in the control system will otherwise be the same as those described in connection with the operating phase corresponding to Fig. 8.

The next and last step (see Fig. 11) is to return the idle boom again from its outward to its inactive position while retaining the pistons 22 of the auxiliary cylinders 21 retracted. This requires that means be provided for preventing the piston rods 22 from again being automatically extended incident to the return movement of the boom. This is accomplished by pushing the auxiliary handle 60 from its normal or active position $n$ to its inactive position $i$ against the pressure of spring 58, whereby the auxiliary valve member 57$^a$ is shifted so as to close port 85$^a$, while opening port 92$^a$. This establishes a low pressure- or drain connection from the rear of cylinders 21 through the branch conduits 87 and 88, the common conduit 86, the port 86$^a$, the flow passage chamber 57$^a$, the port 92$^a$, and then through the heretofore inactive conduit 92, to the reservoir 28. After thus rendering idle the auxiliary cylinders 21, the master control lever 50 is thrown to its F position, which causes the boom to be returned to its inactive position, since the position of the valve member 33 then corresponds to that shown in Fig. 7.

That is to say, hydraulic pressure from the pump is again established through the conduit 76, branch 77, flow passage chamber 39, conduit 82, and branch conduits 83 and 84, to the front ends of the respective main control cylinders 18, the pressure thus acting upon the annular face of the pistons 20$^a$ and causing retraction of the piston rods 20 and thereby the return of the boom 10. Evidently, due to the closure of the port 85$^a$ of the auxiliary control valve, the hydraulic actuating pressure from branch conduit 83 is not transmitted to the auxiliary power cylinders. However, after the boom has been returned to idle position, the master control lever 50 is allowed to return to its neutral or N position, and the auxiliary control handle 60 to its idle or $i$ position. Thus the control system is again ready for a repetition of the operating cycle.

Figure 12:
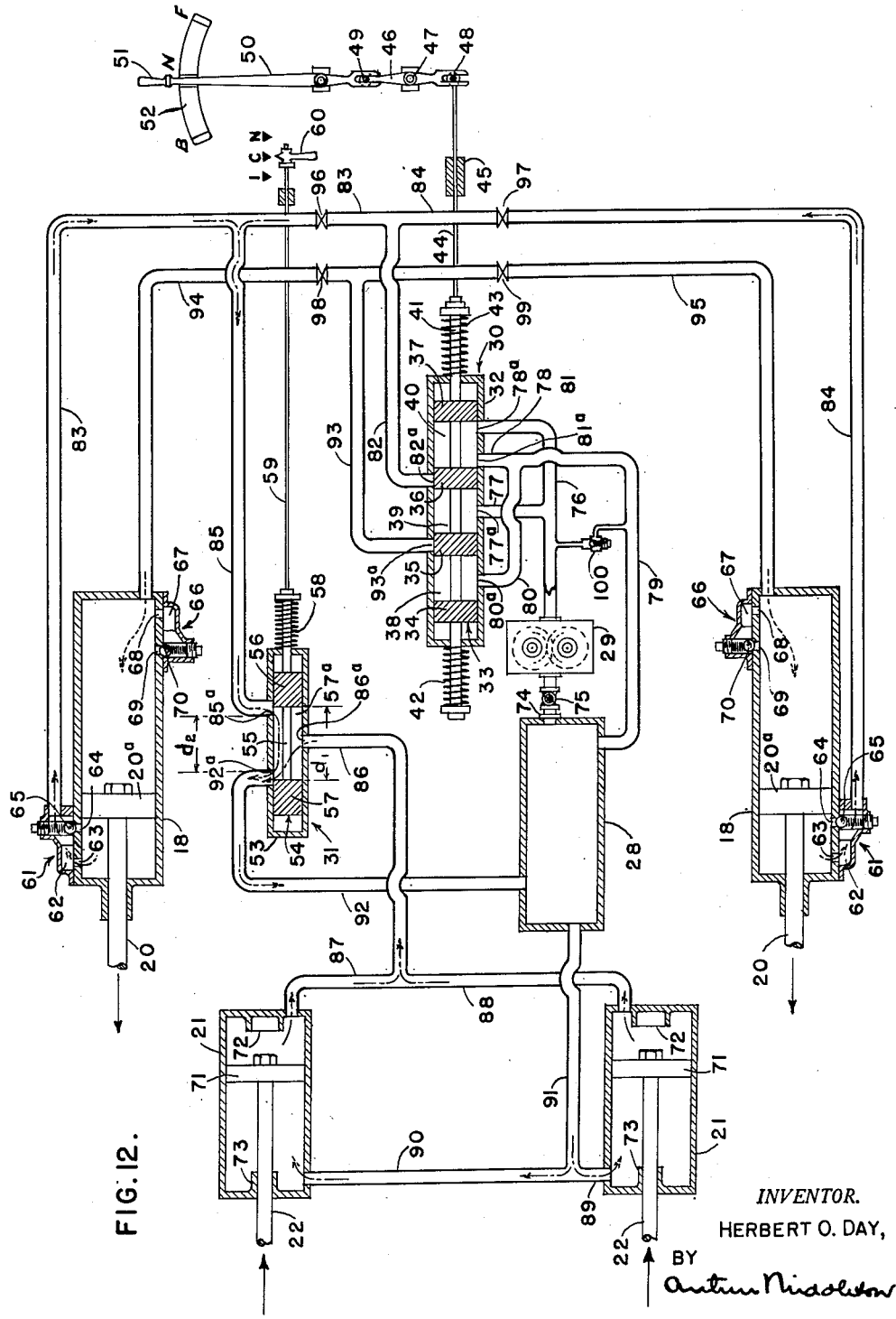

Referring now to Fig. 12, the function of the auxiliary control valve 31 when held in an intermediate position (as indicated by the letter C at the handle 60) makes it possible to control more uniformly and sensitively and, as it were automatically, that phase of lowering a load, that occurs as the boom swings rearwardly past its vertical position. As the boom enters this phase of its rearward movement, the load stresses upon the auxiliary piston rods naturally reverse themselves, tending to accelerate the load towards the ground. Under the conditions described in connection with Fig. 8, this tendency can be held in check by relaxing on the master control lever 50.

However, according to Fig. 12, this effect can be obtained in such a manner that the load will lower slowly and at an even rate, by allowing the master control lever 50 to return to neutral position N, and then moving the auxiliary control handle from its Fig. 8 position to the intermediate or Fig. 12 position C. The special operating effect then obtained in further lowering the load, is due to the fact that the distance $d_1$ between the two portions 57 and 57$^1$ of the auxiliary valve member 54 is somewhat greater than the distance $d_2$ between the ports 92$^a$ and 85$^a$ of the auxiliary control valve.

Consequently, when the valve member 54 is held in the intermediate position C, both ports 92$^a$ and 85$^a$ will be slightly open, the degree of opening being shown with some exaggeration in Fig. 12. Under this condition the load will tend to push the piston rods 22 of the lower cylinders inwardly, and to force pressure liquid through pipes 87 and 88, and the common pipe 86, through port 86$^a$, and then simultaneously through the slightly open port 92$^a$ whereby it is throttled, and through the low pressure pipe 92 into the reservoir 28. The throttling through the slightly open port 92$^a$ will therefore have a retarding effect upon the lowering of the load.

At the same time the load will tend to pull the main piston rods 20 out of their cylinders, but will be yieldingly resisted since any actual flow of hydraulic pressure fluid to or from the upper cylinders is at this time (Fig. 12) blocked due to the neutral position N of the master control lever 50. However, the pull upon the main piston rods 20 will cause them to yield or be extended outwardly as a vacuum is allowed to build up behind the pistons 20$^a$, while fluid at the opposite side of the pistons 20$^a$ is forced out through pipes 83 and 84, and the common pipe 85, whence it may escape through a doubly throttled passage, namely through slightly open ports 85 and 92$^a$, and then through the low pressure pipe 92 to the reservoir 28. Hence, the throttling of compressed fluid from both the main and the auxiliary cylinders, together with the effect of the vacuum temporarily created in the main cylinders and respective connections, will retard the downward movement of the load. As a result, a sufficiently slow and uniform lowering movement of the load is obtainable with a predetermined intermediate operating position of the auxiliary valve member 54.

An undesired condition may occur when the loaded boom is being swung rearwardly of the truck against the extended auxiliary piston rods 22, as per Fig. 8, in case the auxiliary valve member 54 should at that time for some reason have become stuck in the intermediate position C. In that case, no harm would come to the mechanism, such as the possible overstressing or buckling of the main and the auxiliary piston rods resisting each other, as pressure fluid will be allowed to be displaced through pipe 86 from the auxiliary cylinders, and through pipe 85 from the main cylinders, through the then slightly open port 92$^a$ and the pipe 92 into the reservoir 28.

I claim:

1. Loading apparatus adapted to be mounted upon a vehicle comprising a hoisting member adapted to be hingedly mounted upon the rear end of the vehicle frame for swinging movement about an axis extending transversely of the vehicle frame, and actuating means for swinging the hoisting member comprising a main hydraulic power cylinder adapted to have its bottom end pivotally mounted upon the vehicle frame, a piston rod for said main cylinder and having a power stroke in each direction means connecting the main piston rod with said hoisting member, an auxiliary hydraulic power cylinder adapted to have its bottom end pivotally mounted upon the vehicle frame, a piston rod for said axuiliary cylinder and having a power actuated extension stroke, a guide link connecting the auxiliary piston rod and the hoisting member whereby the auxiliary piston rod when extended becomes either engaged by or disengaged from said hoisting member at a predetermined intermediate point in the path of movement of said member, one of said piston rods applying force to said hoisting member at a point substantially above, the other of said piston rods applying force to the hoisting member at a point substantially below the swinging axis of said member; said actuating means also including a control system having hydraulic pressure producing means, a reservoir for hydraulic pressure liquid, a main valve for controlling the direction of liquid flow in the system, and conduit means operatively connecting the main valve with said pressure producing means and with said power cylinders as well as with said reservoir; said main valve being operable in one position to direct pressure liquid through said conduits to extend the main piston rod to impart swinging movement to the hoisting member in one direction during the latter part of which movement the previously extended auxiliary piston rod cushions the hoisting member, and when said valve is in another position being operable to direct pressure liquid to retract the main piston to effect return movement of the hoisting member meanwhile directing pressure liquid to extend the auxiliary piston rod to aid said return movement during an initial portion of such return movement.

2. Loading apparatus according to claim 1, in which the main piston rod applies force to the hoisting member at a point substantially above, and the auxiliary piston rod applies force to the hoisting member at a point substantially below the swinging axis of the member, and in which both cylinders are furthermore disposed, and the control system operable to empower the main cylinder to swing the member from its idle position on the vehicle to an operative rearward position, while the lower cylinder is effective to cushion the weight of said member during the latter phase of the rearward swinging movement thereof, and conversely to empower both cylinders to be effective in returning the member towards its initial idle position.

3. Loading apparatus according to claim 1, in which the main valve is of the sliding piston type operable to assume two opposite extreme positions effecting swinging movement of the loading member towards corresponding limit positions, and also operable to assume an intermediate neutral position whereby the power cylinders are hydraulically locked in an intermediate operating condition while the pressure producing means are short-circuited with the reservoir.

4. Loading apparatus adapted to be mounted upon a vehicle, comprising a hoisting member adapted to be hingedly mounted upon the rear end of the vehicle frame for swinging movement about an axis extending transversely of the vehicle frame; and actuating means for swinging the hoisting member comprising a main hydraulic power cylinder adapted to have its bottom end pivotally mounted upon the vehicle frame, a piston rod for said main cylinder and having a power stroke in each direction, means connecting the main piston rod with said hoisting member for imparting force thereto at a point substantially above the swinging axis thereof, an auxiliary power cylinder adapted to have its bottom end pivotally mounted upon the vehicle frame, a piston rod for said auxiliary cylinder and having a power actuated extension stroke for applying force to the hoisting member at a point substantially below the swinging axis thereof, a guide link connecting the auxiliary piston rod with the hoisting member whereby the auxiliary piston rod when extended becomes either engaged by or disengaged from said hoisting member at a predetermined intermediate point in the path of movement of said member, said actuating means also including an hydraulic control system having hydraulic pressure producing means, a reservoir for pressure liquid, a main valve for controlling the direction of flow of liquid in the hydraulic system, and conduit means operatively connecting the main valve with said pressure producing means and with said power cylinders as well as with said reservoir, said conduit means comprising pressure feed means leading from the pressure producing means to said main valve, flow return means leading from the main valve to the reservoir, a first main conduit connection leading from the main valve to the front end portion of the upper power cylinder, a branch connection leading from said first main conduit connection to the rear end of said lower power cylinder, a second main conduit connection leading from said main valve to the rear end of said upper power cylinder, and a low pressure connection leading from the front end of said lower cylinder to the reservoir, said main valve and said conduit means being effective in one limit position of the valve to admit pressure from said pressure producing means through the valve to the front end of said upper cylinder as well as to the rear end of said lower cylinder, while establishing low pressure drain connection from the rear end of the upper cylinder through the valve to the reservoir, said valve and said conduit means being effective in an opposite limit position of the valve to admit pressure from said pressure producing means through the valve to the rear end of said upper cylinders, while establishing low pressure drain connection from the front end of the upper cylinder as well as from the rear end of the lower cylinder through the valve to the reservoir, said main valve when in the one of its limit positions directing liquid flow to extend the main piston rod to impart swinging movement to the hoisting member in one direction while causing the previously power extended auxiliary piston rod to cushion the hoisting member during the latter part of said swinging movement, said main valve in the other of its limit positions directing liquid flow to retract the main piston rod to impart return movement to the hoisting member while causing the auxiliary piston rod to be power extended to aid said return movement during an initial portion thereof, said valve in off limit positions being operable to controllably throttle the drainage from either end of the upper cylinder as well as from the rear end of the lower cylinder for thereby controlling the lowering of a load suspended from said hoisting member, said valve and conduit means being effective in an intermediate neutral position of the valve to block associated conduit connections in a manner to hydraulically lock the pistons of the power cylinders against movement, while establishing direct short-circuiting connection through the valve between said pressure feed means and said flow return means.

5. Loading apparatus according to claim 4, with the addition of auxiliary valve means for optionally shutting said branch connection leading to the rear end of the lower cylinder, a drain connection leading from the auxiliary valve to the reservoir, said auxiliary control valve having means effective to connect the rear end of said lower cylinder with the last mentioned drain connection substantially concurrent with the shutting off of said branch connection.

6. Loading apparatus according to claim 4 with the addition of auxiliary control valve means for optionally shutting said branch connection leading to the rear end of the lower cylinder, a drain connection leading from the auxiliary valve to the reservoir, said auxiliary valve having means effective to connect the rear end of said lower cylinder with the last-mentioned drain connection substantially concurrent the shutting off of said branch connection, or alternatively to establish a throttled flow passage through said branch connection as well as a throttled flow passage between said branch connection and said drain connection.

7. Loading apparatus adapted to be mounted upon a vehicle, comprising a hoisting member hingedly mounted upon the rear end of the vehicle frame for swinging movement about an axis extending transversely of the vehicle frame, and actuating means for swinging the hoisting member comprising a main hydraulic power cylinder adapted to have its bottom end pivotally mounted upon the vehicle frame, a main piston rod having a power stroke in each direction, means connecting the main piston rod with said hoisting member for swinging the same, an auxiliary hydraulic power cylinder adapted to have its bottom end pivotally mounted upon the vehicle frame, a piston rod for said auxiliary cylinder having a power actuated extension stroke, a guide link pivotally connected with the auxiliary piston rod and pivotally associated with the hoisting member whereby the auxiliary piston rod when power extended becomes either engaged by or disengaged from said hoisting member at a predetermined intermediate point of the path of movement of said member, one of said piston rods applying force to said hoisting member at a point substantially above, the other of said piston rods applying force to said hoisting member at a point substantially below the swinging axis of said hoisting member, and fluid pressure means for extending the main piston rod to effect swinging movement of the hoisting member in one direction while causing the previously extended auxiliary piston rod to cushion the hoisting member during the latter part of that swinging movement, and also for retracting the main piston rod for returning the hoisting member while causing the auxiliary piston rod to be power extended to aid said return movement during an initial portion thereof.

8. In a loading apparatus for a vehicle, the sub-combination comprising a hoisting member hingedly mounted upon the rear end of the vehicle frame for swinging movement about an axis extending transversely of the vehicle frame, and actuating means for swinging the hoisting member comprising a main hydraulic power cylinder adapted to have its bottom end pivotally mounted upon the vehicle frame, a main piston rod having a power stroke in each direction, means operatively connecting the main piston rod with said hoisting member for swinging the same, an auxiliary hydraulic power cylinder adapted to have its bottom end pivotally mounted upon the vehicle frame, a piston rod for said auxiliary power cylinder having a power extendable stroke, a guide link pivotally connected with the auxiliary piston rod and pivotally associated with the hoisting member whereby the auxiliary piston rod when power extended becomes either engaged by or disengaged from said hoisting member at a predetermined intermediate point of the path of movement of said member, one of said piston rods applying force to said hoisting member at a point substantially above the swinging axis thereof and the other of said piston rods applying force to said hoisting member at a point substantially below the swinging axis of said hoisting member.

H. O. DAY.